US005485538A

United States Patent [19]

Bowen et al.

[11] Patent Number: 5,485,538
[45] Date of Patent: Jan. 16, 1996

[54] BIDIRECTIONAL WAVELENGTH DIVISION MULTIPLEX TRANSCEIVER MODULE

[75] Inventors: Terry P. Bowen, Etters; Warren H. Lewis, Elizabethtown, both of Pa.; Richard C. Bergstrom, Morgan Hill, Calif.

[73] Assignee: The Whitaker Corporation, Wilmington, Del.

[21] Appl. No.: 269,419

[22] Filed: Jun. 30, 1994

[51] Int. Cl.$^6$ .............................. G02B 6/00; G02B 6/36
[52] U.S. Cl. ............................ 385/92; 385/10; 359/94; 356/141.1
[58] Field of Search .............................. 385/10–15, 24, 385/27, 39, 53, 60, 79, 88, 92, 93; 359/94–95, 118–119; 250/203.2, 338.1; 356/141.1, 4.07, 5.01; 372/50

[56] References Cited

U.S. PATENT DOCUMENTS

| H933 | 7/1991 | Buczek et al. | 250/338.1 |
|---|---|---|---|
| 3,802,780 | 4/1974 | Helm et al. | 356/141.1 |
| 4,068,952 | 1/1978 | Erbert et al. | 356/5 |
| 4,643,521 | 2/1987 | Harstead et al. | 385/33 |
| 4,695,697 | 9/1987 | Kosa | 219/121 LZ |
| 4,730,330 | 3/1988 | Plihal et al. | 372/50 |
| 4,787,696 | 11/1988 | Norris et al. | 385/89 |
| 4,790,616 | 12/1988 | Frenkel et al. | 385/47 |
| 4,824,193 | 4/1989 | Maeda et al. | 350/3.72 |
| 4,834,485 | 5/1989 | Lee | 385/10 |
| 4,887,255 | 12/1989 | Handa et al. | 369/112 |
| 4,912,523 | 3/1990 | Refi et al. | 455/607 |
| 4,995,696 | 2/1991 | Nishimura et al. | 385/88 |
| 5,011,255 | 4/1991 | Bowen et al. | 350/96.19 |
| 5,039,191 | 8/1991 | Myszka | 385/31 |
| 5,058,978 | 10/1991 | Kondoh et al. | 385/43 |
| 5,082,339 | 1/1992 | Linnebach | 385/14 |
| 5,126,869 | 6/1992 | Lipchak et al. | 359/94 |
| 5,127,072 | 6/1992 | Blauvelt et al. | 385/88 |
| 5,127,075 | 6/1992 | Althaus et al. | 385/94 |
| 5,179,609 | 1/1993 | Blonder et al. | 385/89 |
| 5,253,033 | 10/1993 | Lipchak et al. | 359/94 |
| 5,253,313 | 10/1993 | Kishima | 385/38 |
| 5,285,274 | 2/1994 | Tanno et al. | 385/129 |
| 5,293,441 | 3/1994 | Tanisawa | 385/92 |
| 5,345,530 | 9/1994 | Lebby et al. | 385/89 |
| 5,363,221 | 11/1994 | Sutton et al. | 385/10 |

FOREIGN PATENT DOCUMENTS

| 1-225907 | 9/1989 | Japan | 385/89 |
|---|---|---|---|
| 2-19804 | 1/1990 | Japan | 385/89 |

Primary Examiner—Akm E. Ullah
Attorney, Agent, or Firm—Anton P. Ness

[57] ABSTRACT

A compact optical transceiver including a ceramic mounting block 1, with a laser diode 3 abutting a first end of the mounting block for generating light of a first wavelength. A holographic optical element (HOE) 5 is positioned adjacent laser diode 3 and acts as a hologram lens which receives and focuses the generated light to the end face of an optical fiber 13 which is attached to the compact optical transceiver. A glass element 7 is mounted on the mounting block between the diode and the optical fiber end face, and includes dichroic substance 8 coated to the fiber-proximate side of the glass element 7 and acts as a beamsplitter by passing light of a first wavelength and deflecting light of a second wavelength. The glass element 7 is mounted in an angular positioning groove of the mounting block. The beamsplitter 8 receives and passes the generated light of the first wavelength which has been focused by the HOE 5. From a remote transmitter, light of a second wavelength is then transmitted through an optical fiber 13, to the compact optical transceiver from a direction opposite that of the light generated by the laser diode 3. The light transmitted from the optical fiber 13 is then transmitted and output through ferrule 11, attachable to the optical fiber and attached in a second, V-shaped positioning groove of the ceramic mounting block 1. The light of the second wavelength is output to the beamsplitter 8 and is deflected through a bore hole 21 in the ceramic mounting block to a detector 9 abutting the bottom of the mounting block. A blocking filter 15 can be included for blocking light of wavelengths other than the first and second wavelengths from the detector.

30 Claims, 1 Drawing Sheet

BIDIRECTIONAL WAVELENGTH DIVISION MULTIPLEX TRANSCEIVER MODULE

FIELD OF THE INVENTION

The present invention relates to a novel bidirectional wavelength division multiplex transmitter/receiver (transceiver) module adaptable for use with a single mode optical fiber. More particularly, the present invention relates to a transceiver module connectable to a single mode optical fiber which utilizes a computer generated holographic optical element (HOE) to focus light from a laser diode to an optical fiber, and a beamsplitter, such as a glass element thinly coated with a dichroic substance designed to transmit light of the wavelength generated by the laser diode. Light returning from a remote transmitter through the optical fiber is of a second wavelength which does not pass through the beamsplitter, but which is instead reflected by the beamsplitter onto a detector.

BACKGROUND OF THE INVENTION

Optical component packaging to date has employed metallic cans into which are disposed optoelectronic devices, with connections made to optical fibers. Typically, the active optoelectronic device is mounted on a submount and the submount is bonded to a metal package. Wire bonds are used to make electrical connection to wire pins which extend from a metal header. A hermetic seam seal is used to bond a metal cap to the header. Generally, the caps are lensed with a ball lens or have an ultra flat glass window or cap with an optical fiber pigtail.

Typically, the metallic cans include optoelectronic components such as laser diodes or detectors, and are sometimes referred to as can lasers and can detectors. As previously stated, the cans, especially the detector can, is usually a lensed detector can.

In other known optical component packages utilizing laser cans and detector cans, packaging problems arose and alignment problems arose in transmitting light from the laser can into the optical fiber, and in transmitting light from the optical fiber to the detector can. Traditionally, a beamsplitting cube was utilized for focusing the light from the laser can to the optical fiber and for focusing light from the optical fiber to the detector can. This known device was not only bulky in size, but also required substantial precision alignments. Further, the beamsplitting cube, made from two right angle prisms with a coating between adjoining surfaces, was very expensive and thus made the overall device expensive.

SUMMARY OF THE INVENTION

Accordingly, it is a primary object of the present invention to provide a low cost, compact bidirectional wavelength division multiplex transceiver module (or compact optical transceiver) using very few parts.

The objects of the invention are filled by providing a compact optical transceiver comprising:

a mounting block including at least first and second positioning grooves formed therein;

light generating means, abutting a first end of the mounting block, for generating light of a first wavelength;

light focusing means, mounted so as to receive the generated light, for receiving and focusing the generated light to an optical fiber end face;

beamsplitting means, mounted in the first positioning groove of the mounting block, for receiving and passing the generated light of the first wavelength and for receiving and deflecting light of a second wavelength different from the first wavelength;

detecting means, abutting the mounting block, for receiving and detecting the deflected light of the second wavelength; and a ferrule, attachable to the optical fiber and attached in the second positioning groove of the mounting block, for holding the optical fiber end face to receive the focused light of a first wavelength passed through the beamsplitting means and for outputting light of a second wavelength from the optical fiber to the beamsplitting means.

Advantages of this compact optical transceiver of the present invention include: (1) a device which is small in size and therefore compact; (2) a device which can be constructed rather inexpensively; (3) a device which requires a minimal number of parts; and (4) a device which requires only minimal alignment in the X and Y direction with regard to the laser can, and in the Z direction with regard to the ferrule containing the optical fiber.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENT

Known concepts exist regarding alignments and bonds between optoelectronic devices and optical fibers; aligning and bonding metallic cans containing optoelectronic devices to a submount and to other external components; and actively aligned connector assemblies and submounts for optical fiber and optoelectronic devices. Optical alignment can be performed both actively and passively. Active alignments are most common and are required for packages based on transistor outline (TO) cans, such as laser cans or detector cans, since there is no reference to locate the optical device in the can.

An active alignment is where the laser or detector device is operated and a fiber is manipulated in front of it until the optical signal is peaked. The fiber is then bonded to the package. Further, details regarding known connections between the optical fiber and ferrule for example, electrical connections between the laser diode and other external components and between the detector and other external components, conductive leads and wires, will not be further described for the sake of brevity.

Figure 1:
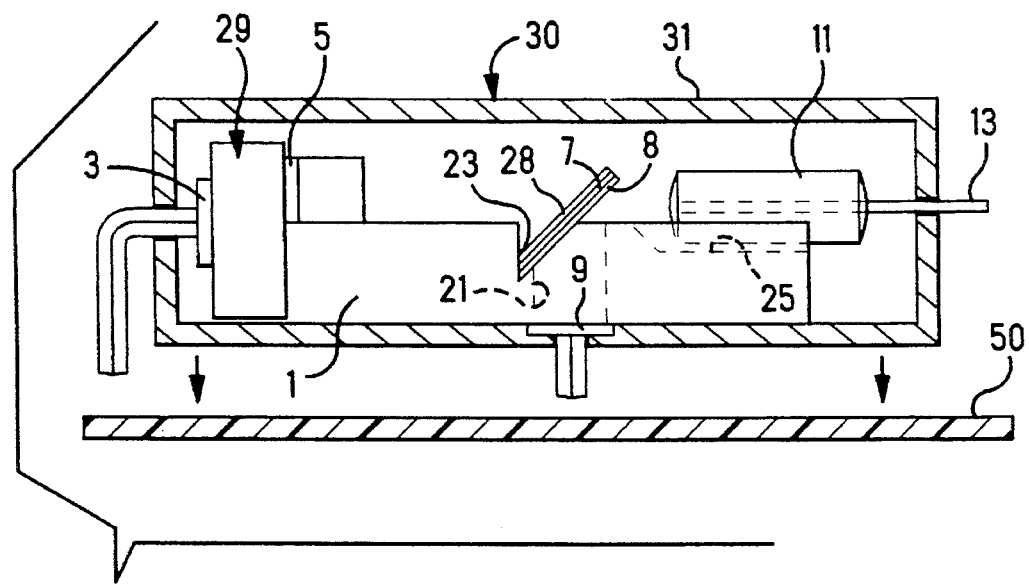
FIG. 1 is a first side elevational view of the bidirectional wavelength division multiplex transceiver module of the present invention.

Referring to FIG. 1, there is illustrated an example of the bidirectional wavelength division multiplex transmitter/receiver (transceiver) module of the present invention. The module includes a laser diode 3 as a light source connected to a mounting block 1, and a light detector 9 connected to mounting block 1. In the present embodiment, the laser diode 3 and detector 9 are included as part of the compact optical transceiver of the present invention and include known external electrical connectors. Mounting block 1 may be a ceramic mounting block or may be made of any similar stable material. An outer covering or enclosure 30 is shown including an upper wall or lid 31. Also shown is a circuit board 50 to which the module is to be mounted with leads of diode 3 and detector 9 connectable to circuits thereof by conventional means.

Mounting block 1 is machined to include first and second angular positioning grooves. The first angular groove 23 (of FIG. 2) includes one angled side, the one angled side extending in a direction perpendicular to a direction of travel of light from laser diode 3. The second groove (25 of FIG. 3) includes a pair of angled sides defining a V-shape, the sides being extended in a direction parallel to a direction of travel of light from laser diode 3. Each of the sides of groove 25 are angled so as to converge at a common line parallel to the direction of light travel (Z direction) thus defining the V-shape as shown in FIG. 3. A third angular positioning groove, similar to the first angular groove 23, may be machined so as to hold filter 15. Further description regarding these angular grooves, and their purpose, will be described hereinafter.

Abutting a first end of mounting block 1 is a laser diode or laser can 3 held within a holder 29 secured to mounting block 1. Abutting a bottom side of the mounting block is a detector or detector can 9. FIG. 1 further illustrates a cylindrical ferrule 11 which is positioned in an angular groove (25 of FIG. 3) of mounting block 1, and which is further attachable to optical fiber 13. Ferrule 11 acts as a mounting aid for optical fiber 13 and is the same as is used in known fiber optic connectors.

A holographic optical element (HOE) 5 is formed and mounted in the module closely adjacent the emitting face of laser diode 3 to traverse the direction of the light emitted therefrom. This holographic optical element can be computer generated, for example, and acts as a hologram lens to focus light from laser diode 3. The HOE 5 is for receiving and focusing light from laser diode 3 to the end face of optical fiber 13 and preferably is mounted as closely as possible to the active emitting face of laser diode 3 and secured to holder 29.

A beamsplitter 8, in one preferred embodiment, includes a glass element 7 which is thinly coated with a dichroic substance 8 so as to pass light of a first predetermined wavelength and so as to block and thereby reflect light of a second predetermined wavelength.

Figure 2:
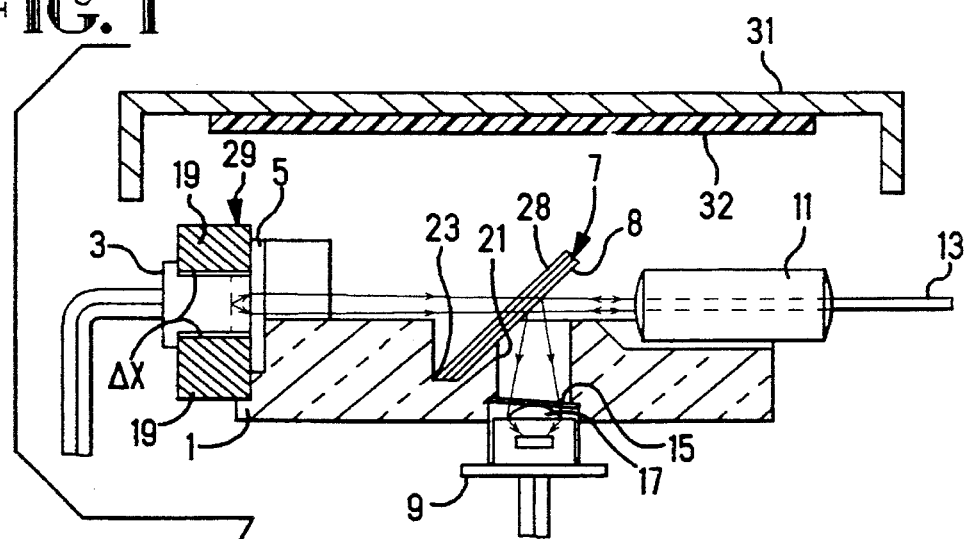
FIG. 2 is a cutaway view of the bidirectional wavelength division multiplex transceiver module as shown in FIG. 1 illustrating light paths from the laser to the optical fiber and from the optical fiber to the detector.
Figure 3:
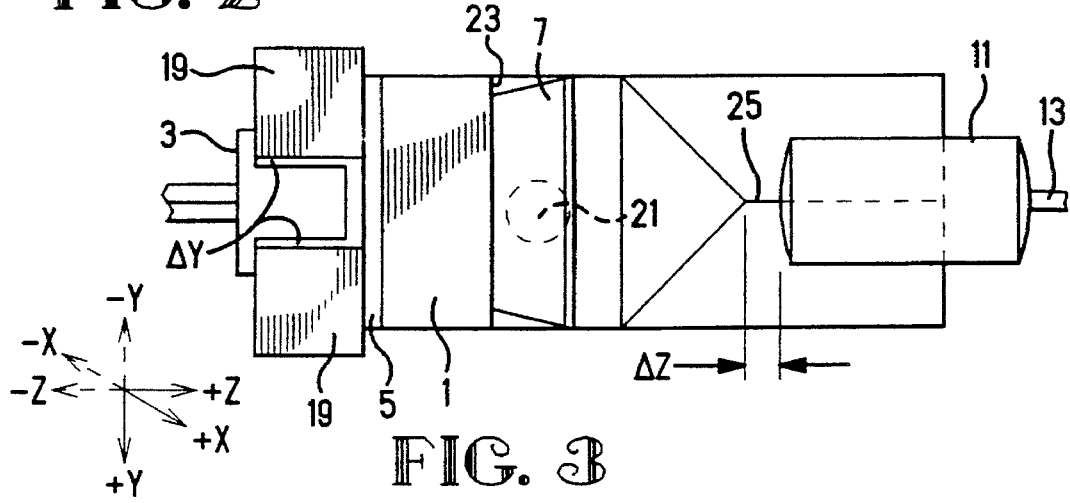
FIG. 3 is a top plan view of the bidirectional wavelength division multiplex transceiver module of FIG. 1.

As shown in FIG. 2, the aforementioned glass element 7 including dichroic beamsplitter 8 is mounted to the mounting block in the angular groove 23 of the mounting block. Angular groove 23 includes one angled side, extending along the Y axis as shown in FIG. 2. The dichroic beamsplitter 8 passes light of a wavelength approximately equal to that generated by laser diode 3 (e.g. a short wavelength such as 1300 nm) and reflects a light of wavelength approximately equal to that generated by a laser diode at a remote transceiver (e.g. a long wavelength such as 1500 nm). At the aforementioned remote transceiver, the dichroic beamsplitter would act in reverse, deflecting light of the short wavelength and passing light of the long wavelength.

Also, as shown in FIG. 2, laser diode 3 abuts a first end of the mounting block, and is attached to holder 29 which includes adjustable clamps 19 extending from the mounting block by an epoxy, or by other more expensive methods such as soldering or welding. Laser diode 3, once properly aligned, can be rigidly fixed to the clamps the or alignment blocks 19 of holder 29 with respect to mounting block 1 for alignment in the X direction ($\Delta X$) and the Y direction ($\Delta Y$).

In other words, laser diode 3 remains still, once positioned with respect to HOE 5, and clamps 19 are movable, based upon an extension or tongue of clamps 19 being slidable in grooves (machined as discussed with grooves 23 and 25) of mounting block 1 in the illustrated X and Y direction of FIGS. 2 and 3 to eliminate any gap of $\Delta X$ and $\Delta Y$ to thereby secure laser can 3. Laser diode 3, once the ring or clamps 19 are properly positioned, can then be mounted to clamps 19 by the aforementioned epoxy. Alternatively, laser diode 3 can be manually aligned in the X direction ($\Delta X$) of FIG. 2, and in the Y direction ($\Delta Y$) of FIG. 3 of the present application, before being affixed to clamps 19 by epoxy.

Further, as shown in FIG. 2, a bore hole 21 is provided in mounting block 1 to provide a pathway for light traveling from dichroic beamsplitter 8 to the 20 detector 9. Bore hole 21 can also be machined as was described with angular grooves 23 and 25. The diameter of bore hole 21 is determined by 0.25× the optical path length between ferrule 11 and detector lens 17. Detector 9 can be lensed detector can, and thus 25 can include a lens 17 as shown in FIG. 2.

Finally, as shown in FIG. 2, a blocking filter 15 can be included, for blocking light greater than a predetermined wavelength, for example 1620 nanometers (1.62 μm), from being sent from optical fiber 13 to detector 9. By using such a filter 15 for blocking light above 1620 nm, radiation is kept from interfering with the receiver or detector 9. This blocking filter is preferably placed above lens 17 to block light of not only wavelengths greater than a predetermined wavelength (1620 nanometers for example) from reaching detector 9, but also ambient light from elsewhere and also light from laser diode 3 that may happen to be reflected toward detector 9 even through beamsplitter 8. Alternatively, blocking filter 15 may be placed elsewhere along the light path between optical fiber 13 and detector 9 such as by placement in a third angular slot (not shown) machined into mounting block 1 similarly to the first angular slot 23.

It is preferred that an antireflective coating 28 such as silicon nitride be provided on the diode-proximate side of glass element 7 to minimize the reflection of any portion of light emitted by diode 3. Further, it is preferred that the inner surface of at least lid 31 be nonreflective such as by being coated with an opaque matte black material 32 to further minimize the possibility of reflection of emitted light reflected upwardly by glass element 7, downwardly toward detector 9.

FIG. 3 illustrates a top plan view of the compact optical transceiver as shown in FIG. 1. This illustrates, more clearly, the bore hole 21 providing a passageway for light from dichroic beamsplitter 8 to detector 9. Further, FIG. 3 also illustrates the V-shaped groove 25 in which ferrule 11 is attached to mounting block 1. The V-shaped groove 25 is a second angular groove machined in the mounting block itself, which includes a pair of angular sides extending in a direction parallel to the direction of light travel (Z-direction) converging on a common line to thereby form a "V". Ferrule 11 can then be aligned and adjustably attached in the aforementioned V-shaped groove 25 to provide for adjustment in the Z-direction as illustrated by ΔZ shown in FIG. 3.

The V-groove is of a size greater than the diameter of ferrule 11. Ferrule 11 is slid in the V-groove using external fixturing and is fastened down with an epoxy before the X:Y alignment of laser diode 3 is finalized.

Finally, in one preferred embodiment, the optical fiber in the ferrule includes an end face having a 6°–9° face angle. This acts to prevent reflected light from returning to the aforementioned remote transmitter through optical fiber 13.

The holographic optical element (HOE) 5 is mounted adjacent the emitting face of laser diode 3, as previously described, and can be efficiently generated by computer programming and etched onto a glass substrate or a silicon substrate coated with glass, similar to glass substrate 7 for example.

By using multiple phase levels in a computer encoding process, it is possible to produce holographic optics such as HOE 5 with over 90% diffraction efficiency. Because holography involves different optics, it can provide wavelength separation useful for wavelength division multiplexing and filtering; not possible with classical optics. Further, holograms such as HOE 5 can be mass produced at a low cost.

HOE 5 acts to focus light generated from laser diode 3 to optical fiber 13. In such a system as is shown in FIGS. 1–3 of the present application, this holographic focusing lens replaces a graded index refractive lens (GRIN) that can cost up to ten times as much. Further, the holographic optical element 5 can be encoded with a pattern that relaxes its alignment tolerance to a single mode fiber.

Holograms work by diffraction rather than refraction and are thus more sensitive than classical lenses to shifts in the wavelength of light, resulting in shifts in the beam direction. Such a problem can further be overcome through the introduction of the holographic achromatic pair. An angular shift in the beam direction from a first hologram can be equally and oppositely compensated by a second hologram. The separate holograms (HOE 5 for example) can be etched on opposite sides of the same glass substrate.

Operation of the compact optical transceiver of the present invention will now be described.

As shown in FIG. 2, light of a first predetermined wavelength (which will pass through beamsplitter 8) is initially generated by laser diode 3. In one preferred embodiment, a laser beam of 1.3 μm is generated with the numerical aperture of 0.5 N.A. (the numerical aperture of 0.5 N.A. being characteristic of this device). The light is then immediately focused by the HOE 5 toward the optical fiber end face (having a numerical aperture N.A. of 0.1), while traveling in the +Z direction as shown in FIG. 2, to optical fiber 13 a distance sufficiently longer (at least five times) than the distance between the HOE and the laser diode's emitting face. Ferrule 11 acts as a precisely positionable mounting device for optical fiber 13 and its end face, which further aids in optical alignment within the module.

Light of a second wavelength of 1.55 μm for example, from a remote transmitter (which can be similar to the compact optical transceiver of FIG. 1) is forwarded through optical fiber 13. This light, traveling in the −Z direction, which is further illustrated by the hash marks in FIG. 2, travels to blocking filter 15 (if present). This blocking filter preferably blocks all light greater than 1620 nm, in one preferred embodiment.

Light then passes to beamsplitter 8, which includes a glass element or substrate 7 coated with a dichroic substance. The dichroic substance may be composed of multilayer dielectric coatings such as ZnS, $Al_2O_3$ or $TiO_2$. The dichroic substance allows for the passing of light beams less than or equal to a first wavelength (for example ≦1.3 μm as generated by laser diode 3), and for the deflecting of light beams greater than or equal to a second wavelength (for example ≧1.55 μm as generated by a laser diode of remote transceiver), the first and second wavelengths being dependent upon the dichroic substance used. However, it should be noted that the aforementioned wavelengths are not limitive of the present invention since it is only necessary for the laser can 3 to generate light of a first wavelength, and for the remote transmitter, which provides light to optical fiber 13 which is eventually output in the −Z direction, to generate light of a wavelength different from the first wavelength. In this preferred embodiment, the light generated by laser diode 3 is of a first wavelength approximately equal to 1.3 μm (and thus passes through dichroic beamsplitter 8 in the +Z direction to optical fiber 13) and the light generated from the remote transmitter traveling in the −Z direction is preferably of a second wavelength of 1.55 μm (and thus is reflected by the dichroic beamsplitter 8 toward detector 9).

The light from the remote transmitter impinges upon the dichroic substance of beamsplitting element 8, and is redirected (or reflected), based upon angular slot 23, through bore hole 21 to detector 9. As previously stated, a light blocking filter 15 is preferably present proximate to lens 17 of FIG. 2, for blocking all light above a predetermined wavelength, for example 1620 nanometers. Lens 17 acts to focus light onto a small active area of detector 9 (50 μm), for subsequent detection by detector 9.

As previously mentioned, two optical transceivers (one at a given location and one at a remote location) make up a system. A laser diode 3 of the transceiver at the given location generates light of a first wavelength (e.g. 1.3 μm) that is focused by HOE 5 toward the optical fiber end face. The dichroic beamsplitter 8 of that transceiver passes light of the first wavelength while deflecting light of the second wavelength (e.g. 1.55 μm). It should be understood, however, that a laser diode of the remote transceiver generates light of a second wavelength (e.g. 1.55 μm) and its corresponding dichroic beamsplitter passes light of the second wavelength and deflects light of the first wavelength.

With regard to the formation of the compact optical transceiver itself, in a preferred embodiment, the mounting block can be a molded or a machined ceramic mounting block which provides a base for the transceiver module itself. Angular positioning slot 23, bore hole 21, and V-groove positioning slot 25 can be molded or machined into the ceramic block (and, if necessary, the additional angular positioning slot for block filter 15).

Once the aforementioned positioning slots have been machined or molded, the aforementioned components of the optical transceiver can be positioned and attached to the ceramic mounting block 1. Laser can 3, when properly aligned and positioned, can be soldered or epoxyed to clamps 19, adjusted in the ΔX and ΔY directions. Detector can 9 can then be fixed into position mechanically to a sufficient tolerance. Once glass element 7, with the antireflective coating and dichroic substance 8, and ferrule 11 with optical fiber 13 attached have been positioned and mounted, the optical path components are then sealed with a membrane and overmolded/sealed in a conventional RIM process or with encapsulants in another other low pressure technique. The seal is preferably a hermetic seal.

The invention is not limited to the exact structure described. For example, in place of laser diode 3, other alternative light sources may be used. However, it should be noted that use of a conventional LED for example, might cause a reduction in performance (launch power and bandwidth would be lower).

Also, it should also be noted that specific dimensions of the transceiver may vary, dependent upon parameters of the laser diode 3 and detector 9, as well as the HOE 5, beamsplitter element 7, 8 and ferrule 11. Typically, however, the length of the transceiver is 25 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A compact optical transceiver comprising:
   a mounting block including at least first and second positioning grooves formed therein;
   light generating means, abutting a first end of the mounting block, for generating light of a first wavelength emitted in a direction toward an end face of an optical fiber;
   light focusing means, mounted adjacent said light generating means so as to receive the generated light, for receiving and focusing the generated light to the end face of the optical fiber;
   beamsplitting means, mounted in the first positioning groove of the mounting block, for receiving and passing the generated light of the first wavelength and for receiving and deflecting light of a second wavelength different from the first wavelength;
   detecting means, abutting the mounting block, for receiving and detecting the deflected light of the second wavelength; and
   a ferrule, attachable to the optical fiber and supported in the second positioning groove of the mounting block, for holding the optical fiber for said end face thereof to receive the focused light of a first wavelength passed through the beamsplitting means and for outputting light of a second wavelength from the optical fiber to the beamsplitting means.

2. The compact optical transceiver of claim 1, wherein the light generating means includes a laser diode.

3. The compact optical transceiver of claim 1, wherein the light generating means is secured between adjustable clamps associated with the mounting block.

4. The compact optical transceiver of claim 3, wherein the clamps are adjustable in at least one of a first direction perpendicular to a direction of travel of the generated light, and a second direction perpendicular to both the first direction and the direction of travel of the generated light.

5. The compact optical transceiver of claim 1, wherein the light generating means generates light of approximately 1.3 μm in wavelength.

6. The compact optical transceiver of claim 1, wherein the light focusing means includes a holographic optical element transverse to the direction of the light of the first wavelength.

7. The compact optical transceiver of claim 1, wherein the beamsplitting means includes a dichroic coating formed on a ferrule-proximate side of the glass element.

8. The compact optical transceiver of claim 1, wherein the beamsplitting means passes light of a wavelength less than or equal to approximately 1.3 μm and deflects light of a wavelength greater than or equal to approximately 1.55 μm.

9. The compact optical transceiver of claim 1, wherein the beamsplitting means includes an antireflective coating on an emitter-proximate side thereof.

10. The compact optical transceiver of claim 1, wherein the detecting means is fixed to the ceramic block within a predetermined tolerance.

11. The compact optical transceiver of claim 1, further including:
    a filtering means for blocking light of wavelengths different from the first and second wavelengths.

12. The compact optical transceiver of claim 11, wherein the filtering means includes a blocking filter for blocking received light of a wavelength greater than 1.62 μm from being deflected to the detecting means by the beamsplitting means.

13. The compact optical transceiver of claim 11, wherein the mounting block includes a bore hole, through which the deflected light travels from the beamsplitting means to the detecting means, and the blocking filter is mounted in the bore hole interposed between the beamsplitting means and the detecting means.

14. The compact optical transceiver of claim 1, wherein the second positioning groove of the mounting block is a V-shaped groove, in which the ferrule is adjustable in a direction parallel to the direction of travel of the generated light.

15. The compact optical transceiver of claim 1, wherein the mounting block is ceramic.

16. The compact optical transceiver of claim 1, wherein the first positioning groove includes at least one angled side extending in a direction perpendicular to a direction of travel of light from the light generating means.

17. The compact optical transceiver of claim 1, wherein the optical fiber, attached to the ferrule, has an end face with a 6°–9° end face angle to prevent transmission of any optical reflection.

18. The compact optical transceiver of claim 1, wherein the second positioning groove is a V-shaped groove, including two angled sides extending in a direction parallel to a direction of travel of the generated light.

19. The compact optical transceiver of claim 1, wherein mounting block, light focusing means, beamsplitting means, detecting means, and ferrule are sealed with a membrane.

20. A compact optical transceiver comprising:
    a ceramic mounting block including at least first and second positioning grooves formed therein;
    a light source, abutting a first end of the ceramic mounting block, generating light of a first wavelength;
    a holographic optical element focusing the generated light into an optical fiber;
    a glass element, mounted in the first positioning groove of the ceramic block, the glass element including a dichroic coating on a ferrule-proximate side thereof, receiving and passing the generated light of the first wavelength and receiving and deflecting light of a second wavelength different from the first wavelength, thereby defining a beamsplitter;
    a detector, abutting the ceramic block, receiving and detecting the deflected light of the second wavelength; and
    a ferrule, attached to the optical fiber and the mounting block, receiving the focused and passed light of a first wavelength and outputting light of a second wavelength from the optical fiber to the dichroic-coated side of the glass element.

21. The compact optical transceiver of claim 20, wherein the light source is secured between adjustable clamps of the ceramic mounting block.

22. The compact optical transceiver of claim 20, wherein the clamps are adjustable in at least one of a first direction perpendicular to a direction of travel of the generated light, and a second direction perpendicular to both the first direction and the direction of travel of the generated light.

23. The compact optical transceiver of claim 20, wherein the holographic optical element is mounted transverse to the direction of the light of the first wavelength.

24. The compact optical transceiver of claim 20, further including:

a filter for blocking light of wavelengths different from the first and second wavelengths.

25. The compact optical transceiver of claim 20, wherein the ceramic mounting block includes a bore hole, through which the deflected light travels from the dichroic mirror side of the glass element to the detector.

26. The compact optical transceiver of claim 20, wherein the second positioning groove of the ceramic mounting block is a V-shaped positioning groove, in which the ferrule is disposed for adjustable movement in a direction parallel to the direction of travel of the generated light.

27. The compact optical transceiver of claim 20, wherein the first positioning groove includes at least one angled side extending in a direction perpendicular to a direction of travel of light from the light generating means.

28. The compact optical transceiver of claim 20, wherein the second positioning groove is a V-shaped groove, including two angled sides extending in a direction parallel to a direction of travel of the generated light.

29. The compact optical transceiver of claim 20, wherein the beamsplitter passes light of a wavelength less than or equal to approximately 1.3 µm and deflects light of a wavelength greater than or equal to approximately 1.55 µm.

30. The compact optical transceiver of claim 20, wherein the beamsplitter includes an antireflective coating on an emitter-proximate side thereof.

* * * * *